Dec. 13, 1960   M. A. PETRANTO ET AL   2,963,952
PHOTOGRAPHIC PRINTING APPARATUS
Filed Feb. 18, 1959   4 Sheets-Sheet 3
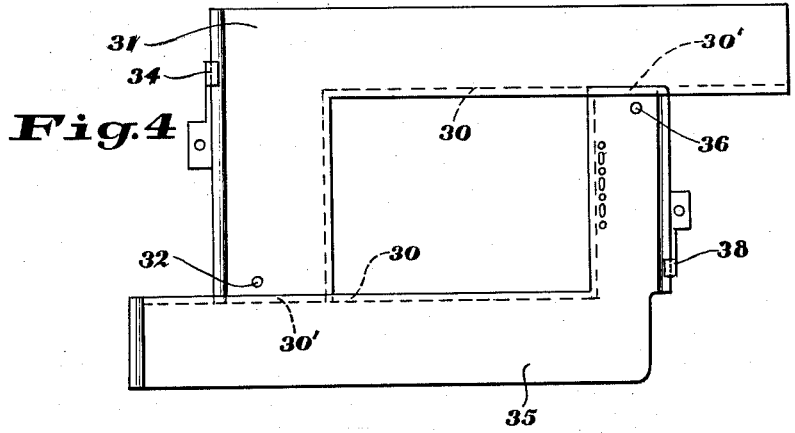
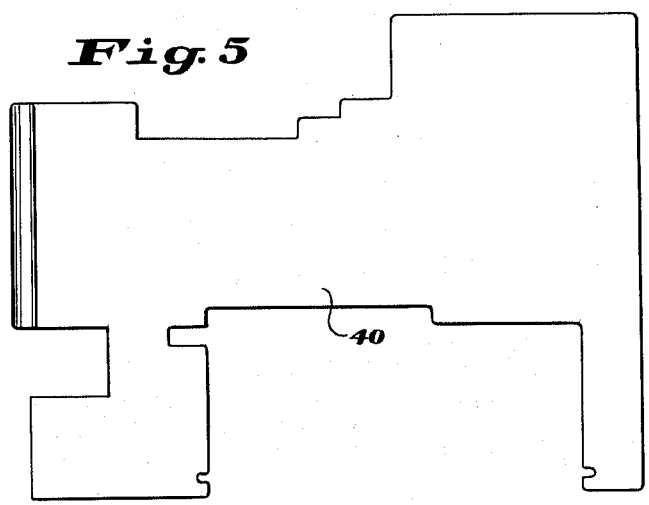
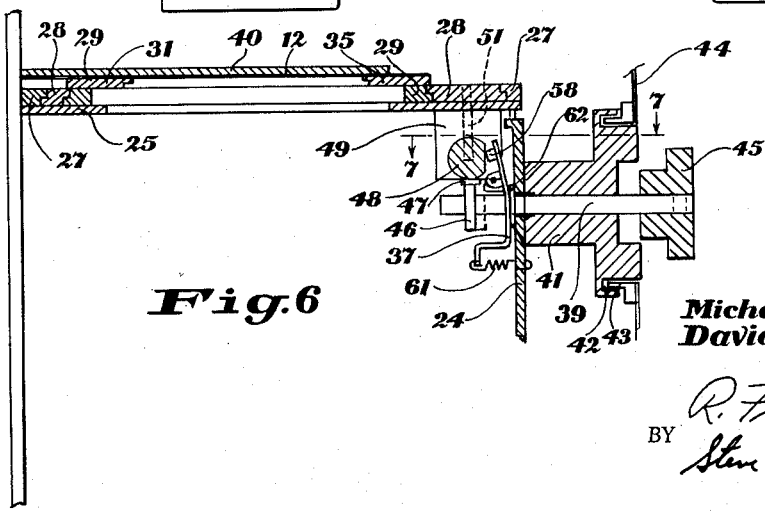
Michael A. Petranto
David L. Champlin
INVENTORS Dec. 13, 1960   M. A. PETRANTO ET AL   2,963,952
PHOTOGRAPHIC PRINTING APPARATUS Filed Feb. 18, 1959   4 Sheets-Sheet 4

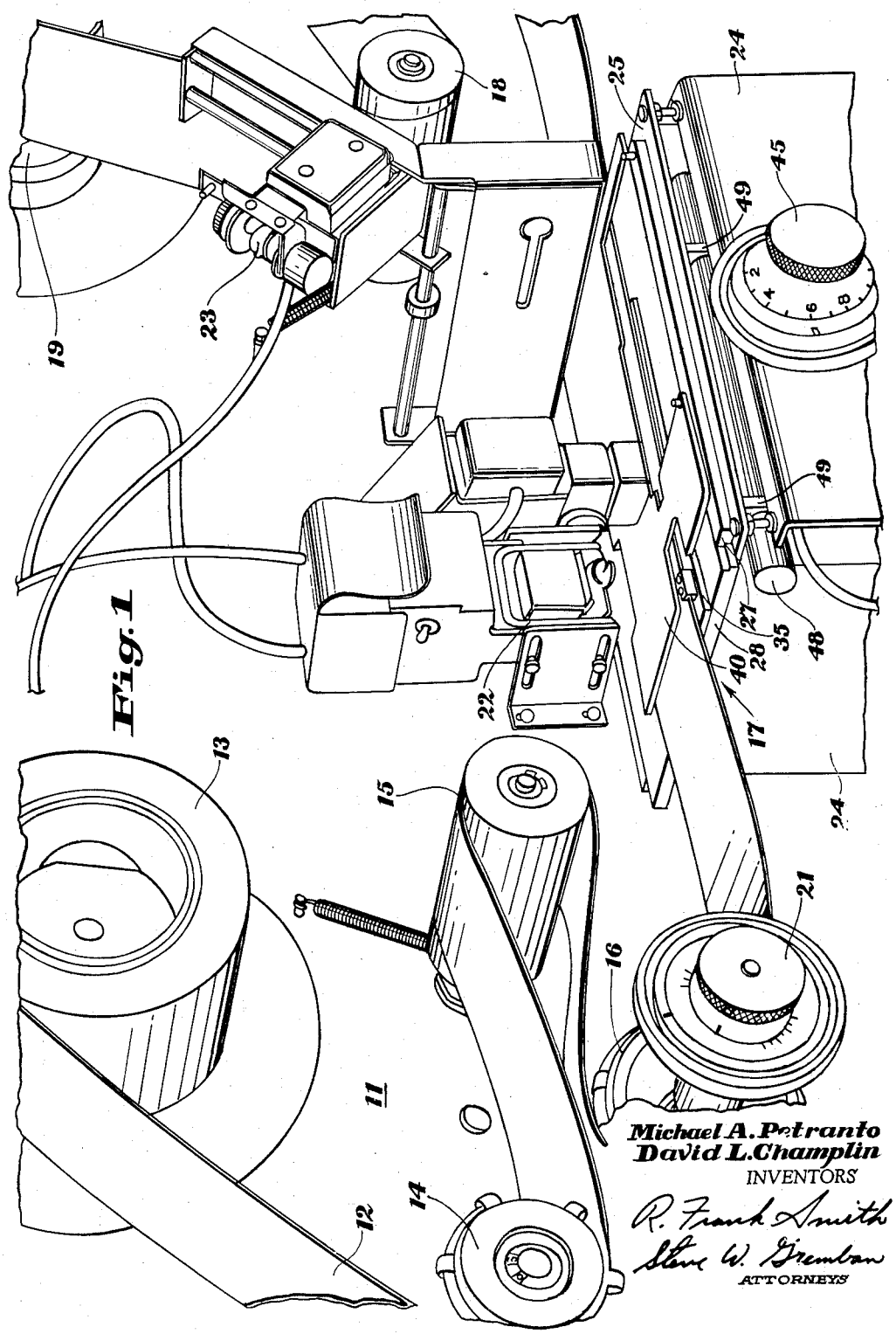

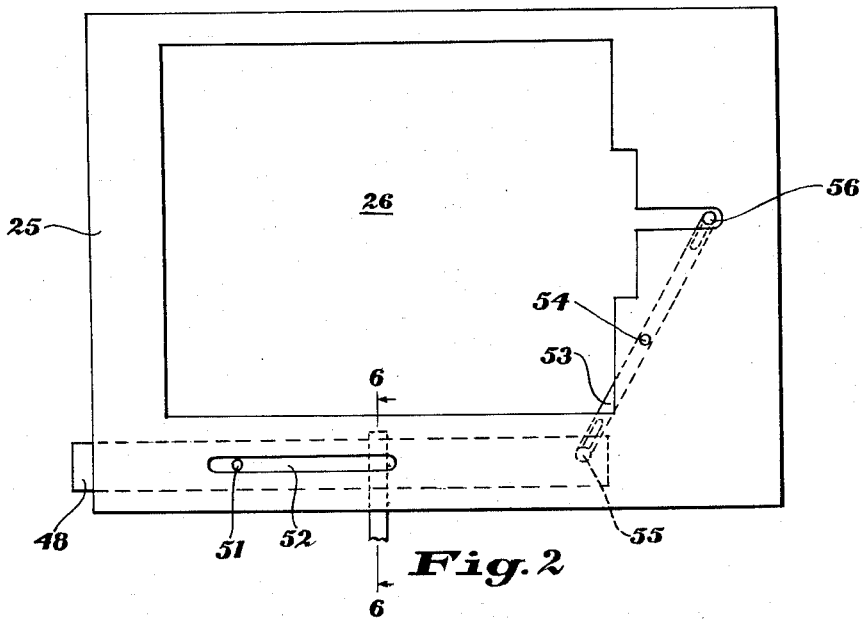
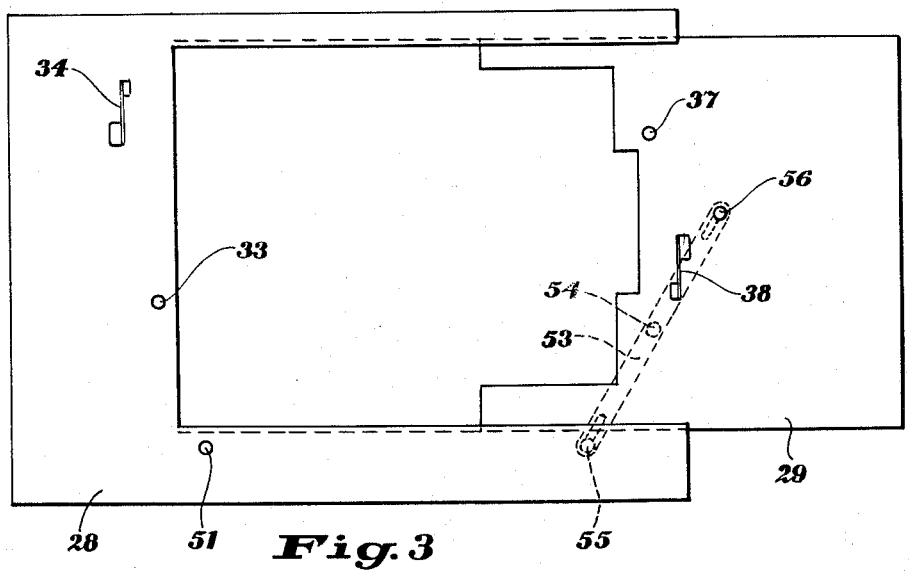

Michael A. Petranto
David L. Champlin
INVENTORS

BY
ATTORNEYS

United States Patent Office 2,963,952
Patented Dec. 13, 1960

2,963,952
PHOTOGRAPHIC PRINTING APPARATUS

Michael A. Petranto and David L. Champlin, Rochester, N.Y., assignors to Eastman Kodak Company, Rochester, N.Y., a corporation of New Jersey Filed Feb. 18, 1959, Ser. No. 794,070

10 Claims. (Cl. 95—79)

This invention relates generally to photographic printers, and more specifically to an adjustable masking mechanism for a photographic printing machine.

Photographic printers have been used in the photofinishing business for years. These printers are normally located in a dark room to prevent the unexposed paper from being exposed during threading and subsequent operation of the printer. The location of the printers in a darkroom presents practical problems and difficulties with respect to threading and operating the printer. Furthermore, the printers are provided with a mask having a picture aperture defining the exact size of the print to be made. The mask is normally removable to permit the use of other masks of different size so that the photofinisher can make prints of varied sizes. However, the necessity for changing the masks is inconvenient, time-consuming and difficult to accomplish in a dark room. In view of the aforementioned difficulties and disadvantages of photographic printers presently on the market, it is readily apparent that a need exists in the photofinishing art for an improved photographic printer adapted to eliminate these disadvantages. Applicants believe that the improved photographic printer disclosed in this application more nearly achieves this objective than any prior known printers.

The primary object of the present invention is to provide an improved photographic printer having an adjustable masking mechanism.

Another object of the invention is to provide an improved photographic printer having an enclosed adjustable masking mechanism that may be adjusted while the printer is being operated under regular light conditions.

Still another object of the invention is to provide an improved adjustable mask mechanism for a photographic printer that is of simple design and construction, thoroughly reliable and efficient in operation, and economical to manufacture.

Objects and advantages other than those set forth above will be apparent from the following description when read in connection with the accompanying drawing, in which:

Fig. 1 is a segmental view in perspective of a photographic printer incorporating an adjustable mask constructed in accordance with a preferred embodiment of the present invention;

Fig. 2 is a plan view showing the support member for the masking mechanism;

Fig. 3 is a plan view showing the left and right-hand sliding plates which are mounted on the support member of Fig. 2;

Fig. 4 is a plan view of the masking plates which are mounted on the sliding plates of Fig. 3;

Fig. 5 is a plan view of a platen which is adapted to bear against the masking plates of Fig. 4;

Fig. 6 is a section view substantially taken along line 6—6 of Fig. 2 showing in addition to the support member, the sliding and masking plates and remaining mechanism for adjusting the masking plates;

Figure 8:
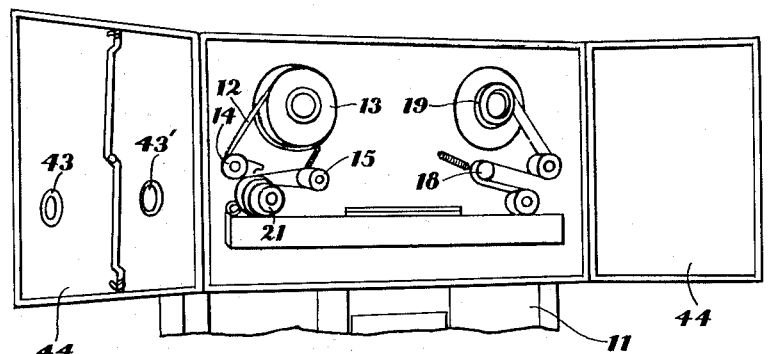
Fig. 8 is a segmental view of a photographic printer showing the cabinet in which the printing mechanism is mounted and with the doors in an open position.

As shown in the drawings, a preferred embodiment of this invention is illustrated as applied to a photographic printer. As is well known, the printer essentially comprises a printing lamp positioned to illuminate a photograph which is to be printed. The photograph is imaged by a projection lens onto a light-sensitive photographic material 12 supported in the exposure plane. The photographic material 12 is fed from a supply roll 13 over guide roller 14, tensioning roller 15, and a measuring roller 16 through a gate support structure 17, over tensioning roller 18 and onto a take-up roll 19. Means are provided for advancing the material 12 in measured increments determined by the measuring roller 16 which is adjustable by knob 21 for successively spacing the image along the photographic material 12. Accessory units for the printer 11 may be provided such as a numbering stamp 22 for automatically numbering the prints, a pivotally mounted print marker 23 for applying a black mark to the rear side of the material at some fixed point relative to the space between successive printed images and which is used to control means for chopping the prints apart by cutting transversely of the strip material. Also, a dater-coder, not shown, may be provided for applying the date and a code mark to each print.

The gate support structure 17 which includes the adjustable masking mechanism constituting the present invention comprises a housing 24 having an upper plate 25 provided with a light opening 26 as seen in Fig. 2. The upper plate 25 is provided with a gib 27 along oppositely disposed edges as best seen in Fig. 6 for slidably supporting a substantially U-shaped plate 28 as shown in Fig. 3. The plate 28 is in turn adapted to slidably guide and support another substantially U-shaped plate 29 slidably movable in the same plane as the plate 28 and gib 27. An L-shaped masking element 31 as seen in Fig. 4 has a hole 32 at one end for receiving a pin 33 carried by the plate 28 and about which masking element 31 may pivot. A leaf spring 34 is mounted on plate 28 having one end in engagement with masking element 31 for urging it in a clockwise direction. Another L-shaped masking element 35 has a hole 36 near one end for receiving a pin 37 carried by plate 23 and about which masking element 35 may pivot. The plate 29 further carries a spring 38 similar to spring 34 having one end adapted to engage masking element 35 for urging it in a clockwise direction. One edge and one end of each of the masking elements 31, 35 is provided with cooperating complementary stepped portions 30 and 30', respectively, as shown in Fig. 4 to facilitate their relative sliding movements. The masking elements 31, 35 when properly mounted on plates 28, 29 respectively cooperate to provide a picture aperture defining the exact size of the print to be made. The print material is guided over the masking elements 31, 35 and is held in contact therewith by a backing plate or platen 40.

Figure 9:
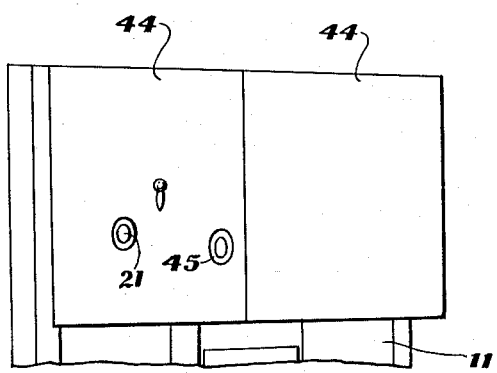
Fig. 9 is a view similar to Fig. 8 showing the cabinet with the doors closed.
Figure 7:
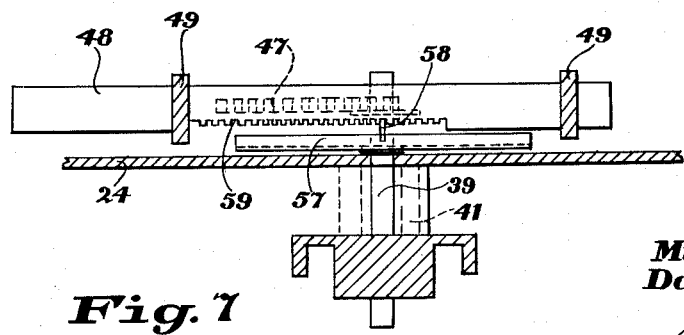
Fig. 7 is a section view substantially taken along line 7—7 of Fig. 6.

The mechanism for slidably adjusting the masking elements 31, 35 for varying the size of the picture aperture formed thereby as best seen in Figs. 6 and 7 comprises a shaft 39 journaled in a bushing 41 secured to housing 24. One end of bushing 41 is enlarged and has an annular groove 42 near its periphery for receiving an annular member 43 carried by a door 44 to form a light lock preventing light from entering the printing cabinet when doors 44 are closed as shown in Fig. 9. A similar light lock structure 43' is provided for the measuring knob 21. One end of shaft 39 is provided with a knob 45 having a scale with print size indicia thereon adapted to cooperate with an index mark on the bushing 41, and the opposite end has a gear 46 engaging a rack 47 formed by a sliding bar 48. The bar 48 is slidably supported by flanges 49 secured to top plate 25. The bar 48 is rigidly secured to U-shaped plate 28 by a pin 51 which extends through a slot 52 of plate 25 so that movement of the bar 48 causes a corresponding movement of plate 28. The bar 48 is further secured to the other U-shaped plate 29 by a lever 53 pivotally mounted intermediate its ends to top plate 25 at 54. Each end of lever 53 is slotted and one end receives a pin 55 carried by bar 48 and the opposite end receives a pin 56 carried by U-shaped plate 29. It is obvious therefore, that movement of bar 48 in one direction causes U-shaped plate 28 to move in the same direction and U-shaped plate 29 to move in the opposite direction. A detent is provided as best seen in Fig. 6 for releasably holding bar 48 in a selected position comprising a pivotally mounted lever 57 forming a lip 58 adapted to engage teeth 59 shown in Fig. 8 formed along one side of bar 48, and a spring 61 connecting the opposite end of lever 57 to housing 24 for urging lip 58 into engagement with teeth 59. The shaft 39 is provided with a disk 62 secured thereto in engagement with lever 57 and adapted when shaft 39 is axially moved inwardly from the inoperative position, shown in Fig. 6, to an operative position to withdraw lip 58 from teeth 59 freeing bar 48. The rack 47 is considerably wider than gear 46 and the two are positioned so that they are always in engagement no matter what position shaft 39 is in. Rotation of knob 45 and shaft 39 with shaft 39 in the operative position causes bar 48, support plates 28, 29 and masking plates 31, 35 to be moved therealong. The operator turns the knob until the indicium thereon corresponding to the desired print aperture size is in register with the index whereupon the correct print aperture is secured. Upon release of knob 45, detent spring 61 urges shaft 39 and knob 45 to the inoperative position as the detent is moved in a position to lock bar 48.

The invention has been described in detail with particular reference to preferred embodiments thereof, but it will be understood that variations and modifications can be effected within the spirit and scope of the invention as described hereinabove and as defined in the appended claims.

We claim:

1. In an adjustable masking mechanism for a photographic printer, the combination comprising: spaced apart guide members; a substantially U-shaped first plate slidably guided by said guide members; a substantially U-shaped second plate slidably guided by said first plate; an L-shaped first mask pivotally mounted on said first plate; an L-shaped second mask pivotally mounted on said second plate; spring means for urging said first and second masks into engagement with one another to form a print aperture; and driving means connected to said first and second plates for slidably moving said plates and masks in opposite directions for adjustably varying the size of said print aperture.

2. The invention according to claim 1 wherein said driving means comprises a gear rack, a lever pivotally mounted on said base intermediate its ends and having one end connected to said rack and the opposite end connected to one of said first and second plates, a pin connecting said rack to the other of said first and second plates, and a shaft having a gear at one end in driving engagement with said rack and a handle at the other end.

3. The invention according to claim 2 wherein detent means are provided for releasably locking said gear rack in a selected position.

4. The invention according to claim 3 wherein said gear rack is provided with a plurality of spaced apart grooves, said shaft is axially movable and further provided with a flange, and said detent means comprises a pivotal lever having a lip at one end and a spring for urging a portion of said lever into engagement with said flange for axially moving said shaft in one direction, and for urging said lip into engagement with one of said grooves to lock said gear rack in a selected position, and axial movement of said shaft in the opposite direction causes said flange to pivotally move said lever against the bias of said spring withdrawing said lip from said groove to release said gear rack.

5. In an adjustable masking mechanism disposed within a light-tight cabinet, the combination comprising: a support member; a pair of masks slidably mounted on said support member; connecting means including a gear rack interconnecting said masks so that movement of one of said masks in one direction causes a corresponding movement of the other mask in the opposite direction; a first light lock member carried by said support member; a second light lock member carried by said cabinet and adapted to cooperate with said first light lock member when said cabinet is closed to prevent light from entering said cabinet; and a shaft journaled within said first light lock member having a gear at one end in driving engagement with said gear rack and a handle at the other end for adjustable moving said masks from a position outside of said cabinet.

6. In an adjustable masking mechanism disposed within a light tight cabinet of a photographic printer and adjustable from a position outside the cabinet, the combination comprising: a support member; spaced apart guide members carried by said support member; a substantially U-shaped first plate slidably guided by said guide members; a substantially U-shaped second plate slidably guided by said first plate; an L-shaped first mask pivotally mounted on said first plate; an L-shaped second mask pivotally mounted on said second plate; spring means for urging said first and second masks into engagement with one another to form a print aperture; connecting means including a gear rack interconnecting said first and second plates so that movement of one of said plates and masks in one direction causes a corresponding movement of the other plate and mask in the opposite direction; a first light lock member carried by said support member; a second light lock member carried by said cabinet and adapted to cooperate with said first light lock member when said cabinet is closed to prevent light from entering said cabinet; and a shaft journaled within said first light lock member having a gear at one end in driving engagement with said gear rack and a handle at the other end for adjustably moving said plates and masks to vary the size of said print aperture from a position outside of said cabinet.

7. The invention according to claim 6 wherein said connecting means comprises a lever pivotally mounted on said support member intermediate its ends and having one end connected to said gear rack and the opposite end connected to one of said first and second plates, and a pin connecting said gear rack to the other of said first and second plates.

8. The invention according to claim 7 wherein detent means are provided for releasably locking said gear rack in a selected position.

9. The invention according to claim 8 wherein said gear rack is provided with a plurality of spaced apart grooves, said shaft is axially movable and further provided with a flange, and said detent means comprises a pivotal lever having a lip at one end and a spring for urging a portion of said lever into engagement with said flange for axially moving said shaft in one direction, and for urging said lip into engagement with one of said grooves to lock said gear rack in a selected position, and axial movement of said shaft in the opposite direction causes said flange to pivotally move said lever against the bias of said spring withdrawing said lip from said groove to release said gear rack.

10. In an adjustable masking mechanism for a photographic printer, the combination comprising: spaced-apart guide members; a first plate slidably guided by said guide members; a second plate slidably guided by said first plate; a first mask pivotally mounted on said first plate, a second mask pivotally mounted on said second plate; spring means for urging said first and second masks into engagement with one another to form a print aperture; and driving means connected to said first and second plates for slidably moving said plates and masks in opposite directions for adjustably varying the size of said print aperture.

References Cited in the file of this patent

UNITED STATES PATENTS

| | | |
|---|---|---|
| 2,245,527 | Grabfield | June 10, 1941 |
| 2,342,525 | Berry | Feb. 22, 1944 |